P. MARCELIN & J. SAUNDERS.
PAN FOR CONCENTRATING SULFURIC ACID.
No. 77,202. Patented Apr. 28, 1868.
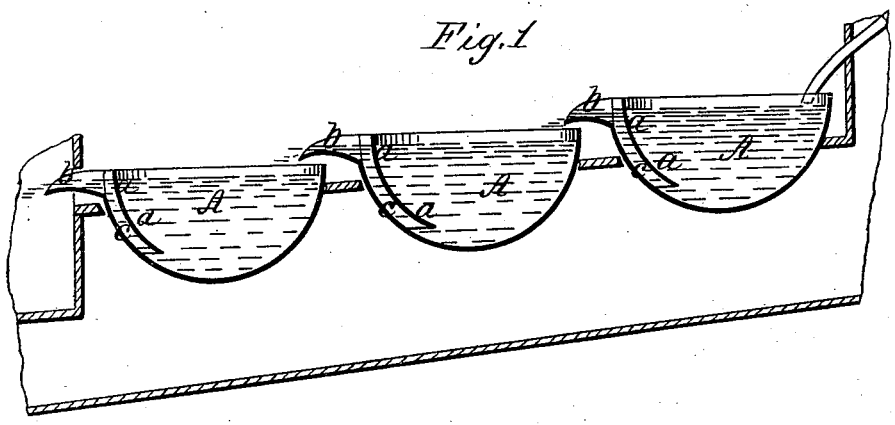
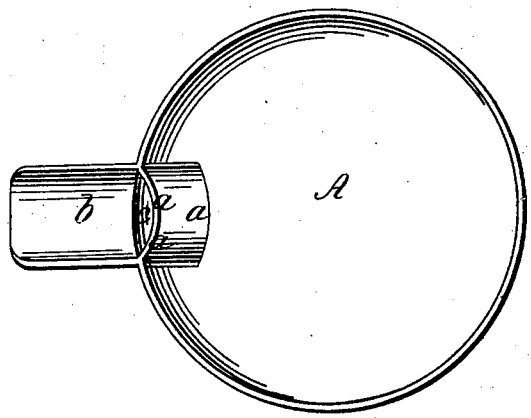

United States Patent Office

PAUL MARCELIN AND JOSEPH SAUNDERS, OF GREEN POINT, NEW YORK.

Letters Patent No. 77,202, dated April 28, 1868.

---

IMPROVED PANS FOR CONCENTRATING SULPHURIC ACID.

---

*The Schedule referred to in these Letters Patent and making part of the same.*

---

TO ALL WHOM IT MAY CONCERN:

Be it known that we, PAUL MARCELIN and JOSEPH SAUNDERS, of Green Point, in the county of Kings, and State of New York, have invented a new and improved Pan for Concentrating Sulphuric Acid; and we do hereby declare that the following is a full, clear, and exact description thereof, which will enable others skilled in the art to make and use the same, reference being had to the accompanying drawings, forming part of this specification, in which—

Figure 1 is a sectional elevation of our improved pans.

Figure 2 is a plan or top view of the same.

Similar letters of reference indicate corresponding parts.

This invention relates to a new pan, to be used in furnaces for concentrating sulphuric acid, and consists in arranging a partition across the pan, which reaches nearly to the bottom of the same, and which causes the lower settled portions of the acid to flow out of the pan.

Heretofore pans have been used in furnaces for concentrating sulphuric acid, but these pans were generally provided with common spouts.

It is well known that the more purified the acid becomes, the heavier it gets, and that, therefore, the acid from which portions of water have been ejected will settle at the bottom of the pans, and will, if an ordinary spout is used, allow the lighter, fresh portions of the acid to float upon and flow over them. Thereby, only a rapid passage through the furnace of the lighter, fresh portions of the acid is obtained, while the heavier, concentrated parts will remain in the pans. To avoid this deficiency, and to obtain a constant circulation of all the contents of the pans, is the object of this invention.

A, in the drawing, represents a pan made of earthenware, glass, or of any other suitable material, of suitable size and shape, a series of such pans being arranged on an inclined plane, or otherwise, in a furnace for concentrating sulphuric acid.

$a$ is a partition arranged across the pan A, either back of the spout $b$ of the same, so as to produce a tubular downward extension, $c$, of the spout, or nearer to the centre of the pan. The partition nearly extends to the bottom of the pan, as shown, and, by its use, the heavier portions of the acid are forced to move out of the pan before the lighter portions can leave the same. More than one partition may be, if desired, arranged within one pan, for the purpose of detaining the acid, and for causing its more complete circulation.

Having thus described our invention, what we claim as new, and desire to secure by Letters Patent, is—

Providing a pan for concentrating sulphuric acid, with a partition or partitions, $a$, reaching nearly to the bottom of the pan, substantially as and for the purpose herein shown and described.

P. MARCELIN,
JOSEPH SAUNDERS.

Witnesses.
   WM. F. McNAMARA,
   ALEX. F. ROBERTS.